(12) United States Patent
Sayre

(10) Patent No.: US 10,176,074 B2
(45) Date of Patent: Jan. 8, 2019

(54) COMPUTED CALL/JUMP TARGET RESOLUTION VIA BEHAVIOR COMPUTATION

(71) Applicant: Lenvio Inc., Manassas, VA (US)

(72) Inventor: Kirk Damon Sayre, Knoxville, TN (US)

(73) Assignee: Lenvio Inc., Manassas, VA (US)

( * ) Notice: Subject to any disclaimer, the term of this patent is extended or adjusted under 35 U.S.C. 154(b) by 0 days.

(21) Appl. No.: 15/709,987

(22) Filed: Sep. 20, 2017

(65) Prior Publication Data

US 2018/0081699 A1  Mar. 22, 2018

Related U.S. Application Data

(60) Provisional application No. 62/397,760, filed on Sep. 21, 2016.

(51) Int. Cl.
*G06F 9/30* (2018.01)
*G06F 9/38* (2018.01)
*G06F 11/36* (2006.01)
*G06F 9/448* (2018.01)

(52) U.S. Cl.
CPC ........ *G06F 11/3612* (2013.01); *G06F 9/3005* (2013.01); *G06F 9/3846* (2013.01); *G06F 9/4486* (2018.02); *G06F 11/3636* (2013.01)

(58) Field of Classification Search
CPC .... G06F 9/3005; G06F 9/3846; G06F 9/4486; G06F 11/3612; G06F 11/3636
USPC .................................................. 717/124–135
See application file for complete search history.

(56) References Cited

U.S. PATENT DOCUMENTS

| 8,046,751 B1* | 10/2011 | Avadhanula | G06F 8/75 717/104 |
| 9,454,659 B1* | 9/2016 | Daymont | G06F 21/566 |
| 2010/0083240 A1* | 4/2010 | Siman | G06F 8/433 717/144 |
| 2011/0066829 A1* | 3/2011 | Tye | G06F 8/4441 712/226 |

(Continued)

OTHER PUBLICATIONS

Linger et al., "Function Extraction Technology: Computing the Behavior of Malware," Feb. 2011. (Year: 2011).*

*Primary Examiner* — Qing Chen
(74) *Attorney, Agent, or Firm* — Garlick & Markison; Randy W. Lacasse

(57) ABSTRACT

A method and system resolving a computed call/jump target with computed behavior. The method begins with stripping a structured control flow graph of a computer program down to only those instructions that can reach a computed call/jump instruction of interest. The method continues by setting instruction semantics of the computed call/jump instruction of interest to a single assignment with a synthetic call target state variable whose value is a symbolic expression representing the computed call/jump target. The method continues by extracting a computed behavior of the stripped structured control flow graph in terms of the synthetic call target state variable and checking a resulting final value of the synthetic call target state variable in the resulting stripped program behavior. When the synthetic call target state variable is equal to a constant, the computed call/jump target has been resolved to the constant value, which is stored to computer storage.

20 Claims, 7 Drawing Sheets

(56) References Cited

U.S. PATENT DOCUMENTS

2014/0380283 A1* 12/2014 Hu ..................... G06F 11/3604
717/132

* cited by examiner

Program: 202

```
Do
    x := x+y;
    y := x-y;
    x := x-y
endDo
```

Function Extraction:

| Assignment | x | y |
|---|---|---|
| 1  x := x+y; | x1 = x0 +y0 | y1 = y0 |
| 2  y := x-y; | x2 = x1 | y2 = x1 -y1 |
| 3  x := x-y | x3 = x2 - y2 | y3 = y2 |

204

Derivations: 206

$x3 = x2 - y2$           $y3 = y2$
$= x1 - (x1 - y1)$            $= x1 - y1$
$= y1$                           $= x0 + y0 - y0$
$= y0$                           $= x0$ (x, y integers; machine precision aside)

Computed Behavior:

208
```
True ->
    x := y
    y := x
```
Conditional
Concurrent
Assignment
(CCA)

Swaps values of x and y

COMPUTED CALL/JUMP TARGET RESOLUTION VIA BEHAVIOR COMPUTATION

CROSS REFERENCE TO RELATED APPLICATIONS

The present U.S. Utility Patent Application claims priority pursuant to 35 U.S.C. § 119(e) to U.S. Provisional Application No. 62/397,760, entitled "COMPUTED CALL/JUMP TARGET RESOLUTION VIA BEHAVIOR COMPUTATION," filed Sep. 21, 2016, which is hereby incorporated herein by reference in its entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL

Linger et al.: "Function Extraction Technology: Computing the Behavior of Malware", IEEE Reliability Society 2009 Annual Technology Report is hereby incorporated by reference in its entirety.

The application also incorporates by reference U.S. Utility application Ser. No. 15/709,825, entitled "CALL TRACE GENERATION VIA BEHAVIOR COMPUTATION," filed Sep. 20, 2017.

BACKGROUND

Technical Field

The present disclosure relates to a method and system for static analysis of computer programs. More specifically, the invention relates to the automated resolution via static analysis of call or jump targets computed at run time by a computer program.

Description of Related Art

Software is changing everything about how we work and live. Today, virtually every organization in business and government is irreversibly dependent on complex systems of billions of lines of code. But what does this code do? Does anyone know for sure? Security and reliability are essential, yet each day brings news of another attack. Security is more reactive than proactive; "bad guys" insert malware, "good guys" try to find it. The result? A never-ending game of catch-up with costly and painful consequences.

Why is this still true after decades of investment in security? The complexity of modern systems makes it impossible for software engineers to understand all possible execution paths with current methods. And, unknown paths can contain exploitable errors or malicious code.

Computing software behavior to manage risks and costs is an approach that computes a behavior of software at machine speeds to reveal its functionality. Key information about the behavior and risks of critical software can be revealed.

Disadvantages of conventional approaches will be evident to one skilled in the art when presented in the disclosure that follows.

BRIEF DESCRIPTION OF THE SEVERAL VIEWS OF THE DRAWING(S)

FIG. 2 is a block diagram showing an example embodiment of computed behavior in accordance with the present disclosure;

DETAILED DESCRIPTION

The embodiments of the present disclosure may be practiced in a variety of computing devices that operate in a wired or wireless environment or network. The embodiments of the present disclosure may be readily adapted to multiple programs, computer languages, etc.

The invention described herein makes use of foundational technology called behavior computation. Basic computed behavior is taught by Linger et al. in "Function Extraction Technology: Computing the Behavior of Malware", which is incorporated by reference.

When behavior is computed, specifics of procedural implementations are replaced by net behavior that can represent a variety of algorithmic strategies.

Figure 1:
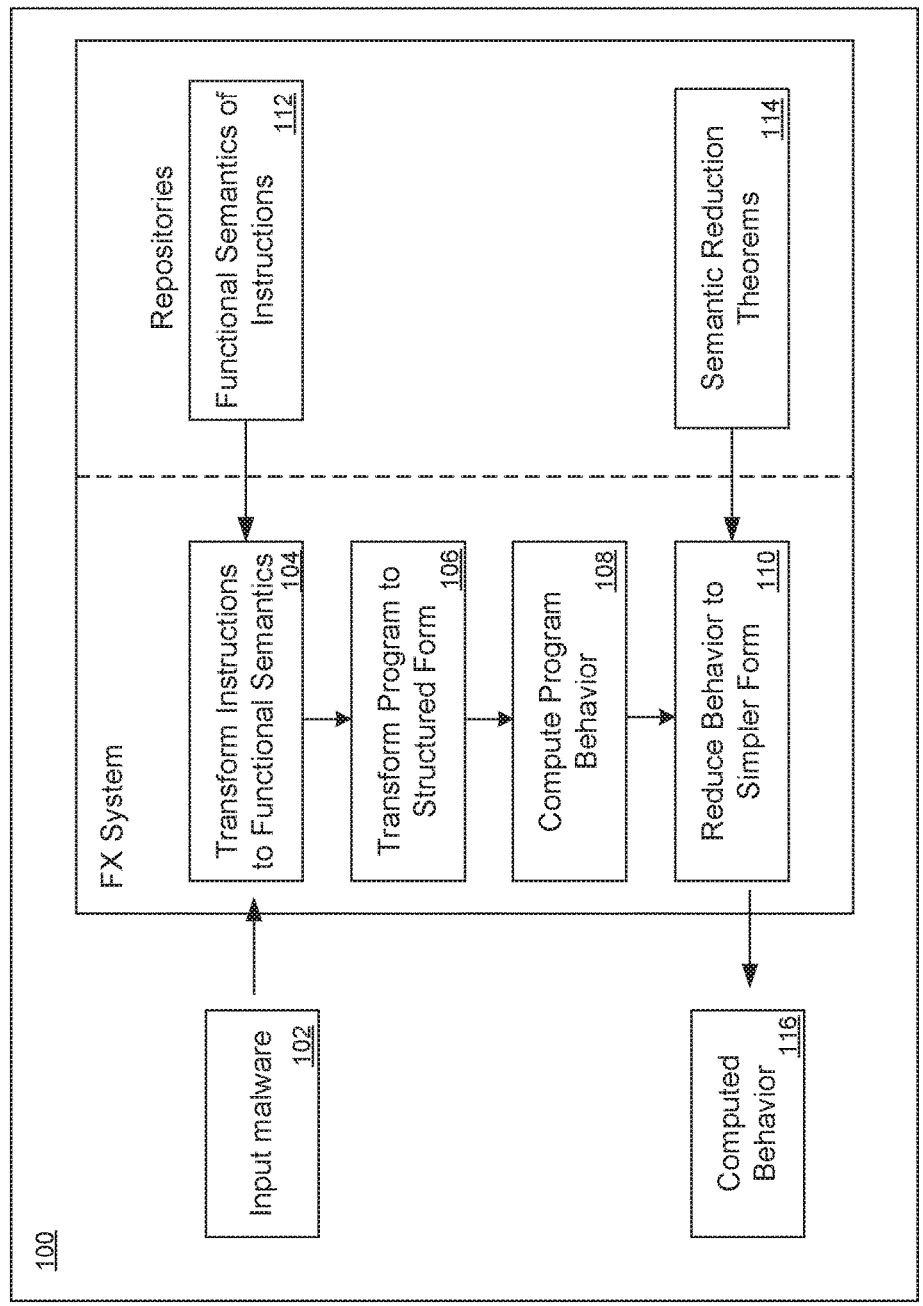
FIG. 1 is a block diagram showing an embodiment of computed behavior in accordance with the present disclosure.

FIG. 1 is a block diagram showing an embodiment of computed behavior in accordance with the present disclosure. To see how a function extraction system works, consider an architecture diagram 100 as shown. A function extraction system operates on binary computer executable files. The algorithmic process of behavior computation may include four principal steps as follows. In step 104, instructions are transformed to functional semantics. Behavior computation operates at the level of functional semantics 112 of program instructions, not syntactic representations. Each instruction in an input program is transformed into a functional form that defines the net effect of the instruction on the state of the system. For example, an add instruction operating on registers not only produces a sum, but also changes the values of certain flag registers on the processor. The instruction transformation is driven by a predefined repository of instruction semantics as shown. In step 106, a program is transformed into a structured form. The true control flow of the input program, including any computed jumps and branching logic, is determined by deterministic reachability analysis in a frontier propagation algorithm. The program is transformed into structured form as guided by a constructive proof of the Structure Theorem. This step expresses the program in an algebraic structure of single-entry, single-exit control structures including sequence, "ifthenelse", and "whiledo".

In step 108, the program behavior is computed. Behavior computation can now be carried out, guided by a Correctness Theorem that defines transformations from procedural structures to non-procedural behavior expressions. A significant amount of mathematical processing is required for this step including accommodation of theoretical limitations on loop behavior computation.

In step 110, behavior is reduced to a final (simpler) form. The computations of step 108 account for all behavior, even taking machine precision into account. This initial behavior is now reduced to final form. In analogy, recall high school algebra and the need to reduce expressions such as (3×3+ 2×2−x 3+4×2) to (2×3+6×2). This process is driven by a repository of Semantic Reduction Theorems (SRTs) as shown in the figure as 114. These microtheorems encapsulate information required to reduce terms in computed behavior to simpler form. The theorems are very general and widely applicable. For example, the library of SRTs for finite arithmetic provides reductions for arithmetic expressions. In addition, computed behavior can exhibit structural relationships useful for organization and presentation. For example, behavior expressions often contain repeated substructures that can be factored and abstracted.

FIG. 2 is a block diagram showing an example embodiment of computed behavior in accordance with the present disclosure. In this example embodiment 200, consider a three-line program 202 that operates on small integers x and y (":=" is the assignment operator). It is not immediately obvious what the program is doing, but its effect can be calculated with a trace table 204 as shown. The table 204 contains a row for each assignment and a column for each variable assigned. Each row shows the effect of its assignment on variables x and y (in the first row, "0" signifies "old value," 1 signifies "new value, and similar for the other rows). Derivations 206 apply algebraic substitutions and reductions in a function composition process to arrive at output values for the program expressed in terms of input values, with intermediate operations abstracted out. This computation 208 reveals that the program is a swap that exchanges the initial values of x and y. The behavior is expressed in terms of a conditional concurrent assignment (CCA). The condition is true (the sequence is always executed since it contains no branching logic), and the assignments to final x and y are carried out concurrently, that is, all expressions on the right of the assignment operators are assigned to all targets on the left at the same time. This CCA structure is the only statement form required in the behavior expression language used by a function extraction system.

When behavior is computed, specifics of procedural implementations are replaced by net behavior that can represent a variety of algorithmic strategies. This simple example depicts generation of behavior knowledge through function composition and illustrates key properties of the process.

Figure 3:
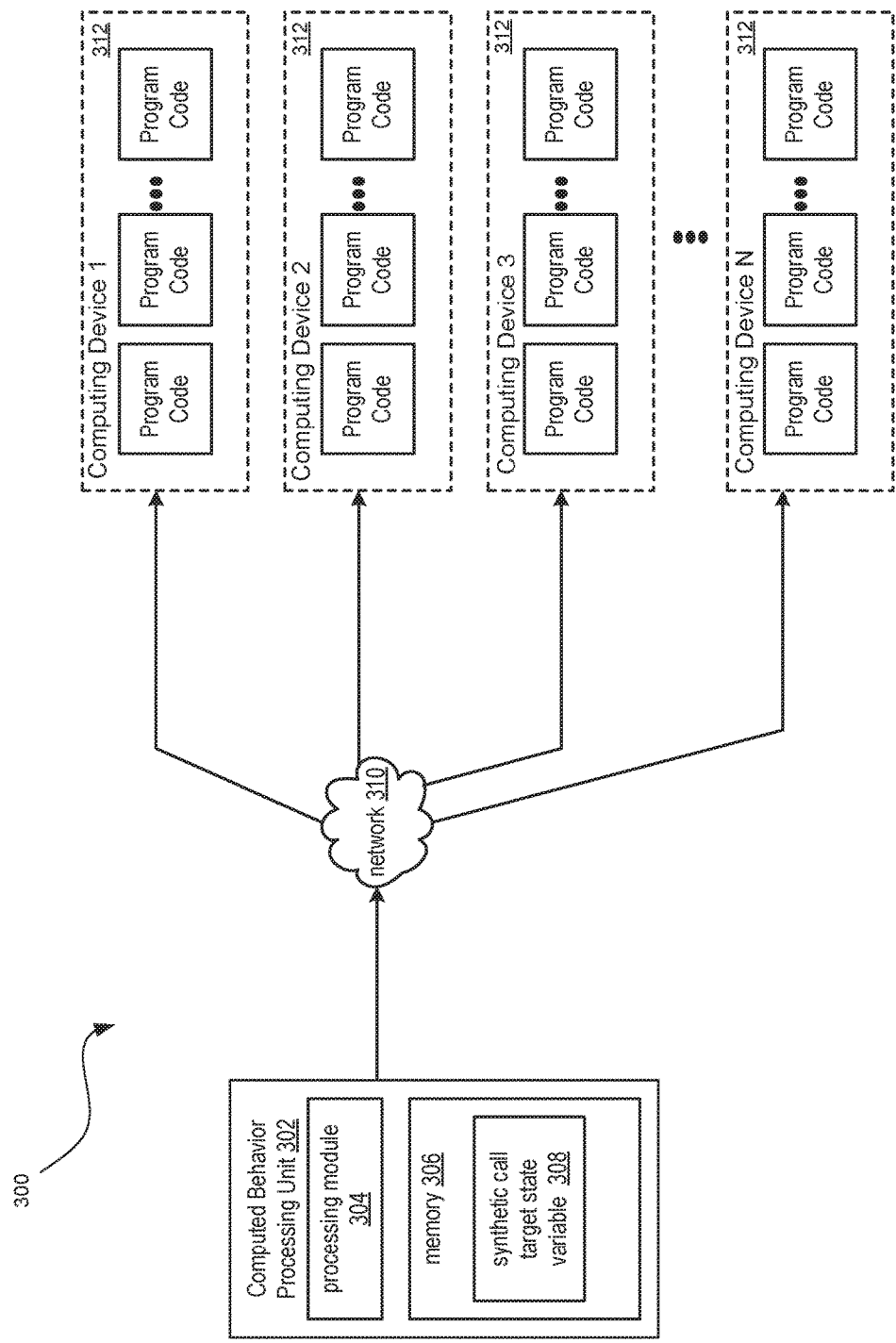
FIG. 3 is a block diagram showing a networked system environment in accordance with the present disclosure.

FIG. 3 illustrates one environment for practicing an embodiment of the present disclosure. FIG. 3 shows a computing system 300 that includes a computed behavior processing unit 302. Computed behavior processing unit 302 includes at least a processing module 304, memory 306, and storage of synthetic call target state variables 308 in memory 306.

Figure 4:
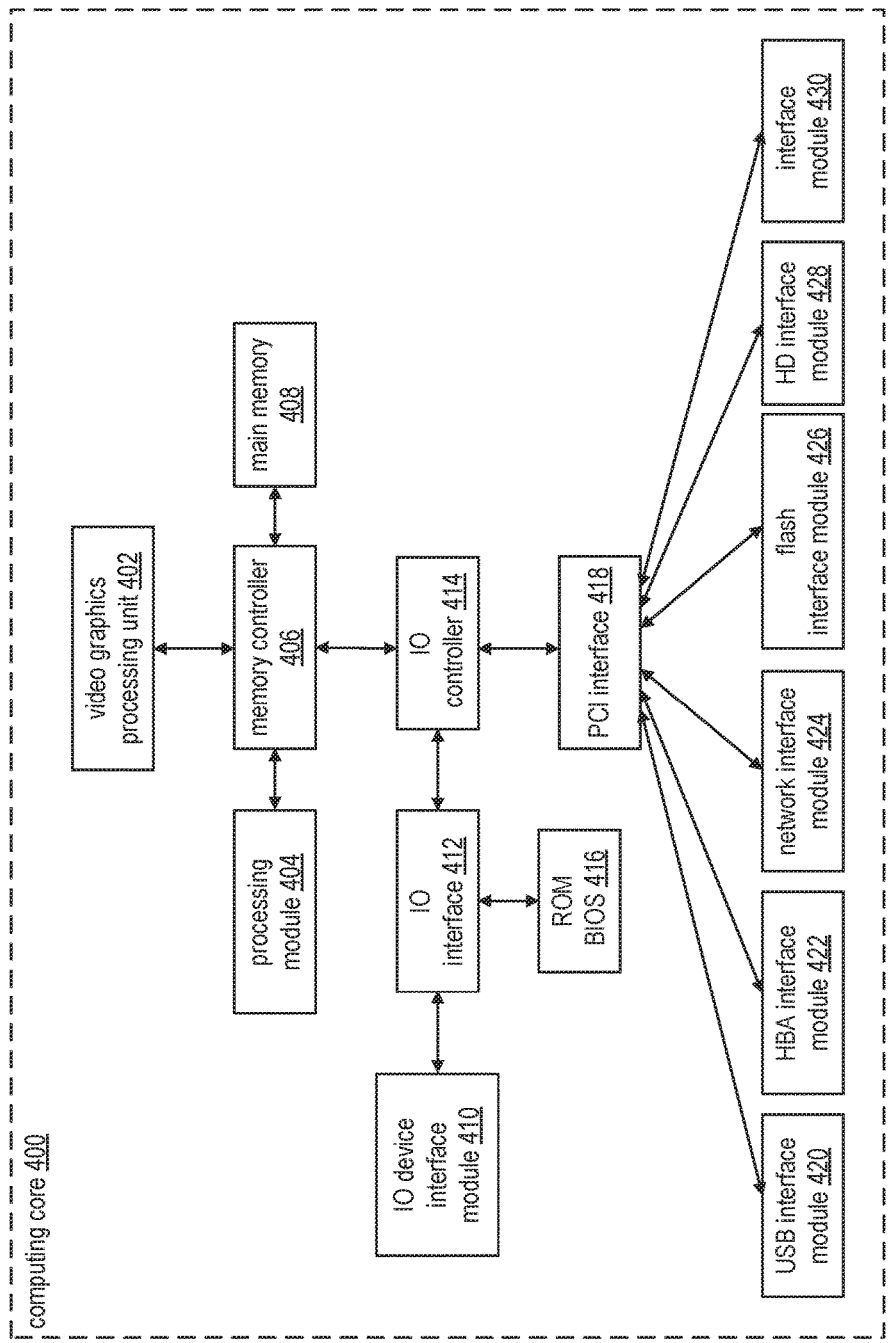
FIG. 4 is a block diagram showing an embodiment of a computing device in accordance with the present disclosure.

Computing devices 312 include any computing device 1-N with a computer processor, interfaces, I/O, communication capabilities, and memory (as is known and further described in FIG. 4). Such devices include, but are not limited to, servers, personal computers, laptops, tablets, smartphones, IOT (Internet of Things devices), etc. The computing devices used in the environment of the technology described herein only require a capacity to store in computer memory a program (code). That program can be downloaded, uploaded, streamed, replicated or otherwise processed as is known in the art. The computing devices may be hardwired, connected wirelessly or both. These computing devices can, in one embodiment, be operably coupled to network hardware via respective local area network (LAN) connections, WAN, Internet, cloud connected processing and storage. Network hardware, which may be a router, switch, bridge, modem, system controller, etc., may provide a wide area network (WAN) connection for a communication system. One or more of the shown computing devices 1-N may include circuitry and/or software which allow the particular device to communicate with each other or with proximal or remote devices.

FIG. 4 is a schematic block diagram of an embodiment of a computing core 400 usable in either computed behavior processing unit 302 or computing devices 312. The computing core includes a video graphics processing unit 402, processing module 404, a memory controller 406, main memory 408, an input/output (IO) controller 414, a peripheral component interconnect (PCI) interface 418, an IO interface module 412, at least one IO device interface module 410, a read only memory (ROM) basic input output system (BIOS) 416, and one or more memory interface modules. The one or more memory interface module(s) includes one or more of a universal serial bus (USB) interface module 420, a host bus adapter (HBA) interface module 422, a network interface module 424, a flash interface module 426, a hard drive interface module 428, and an interface module 430.

Interface module 430 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), interne small computer system interface (iSCSI), etc.). Further note that the I/O device interface module 410 and/or the memory interface modules may be collectively or individually referred to as I/O ports.

Figure 5:
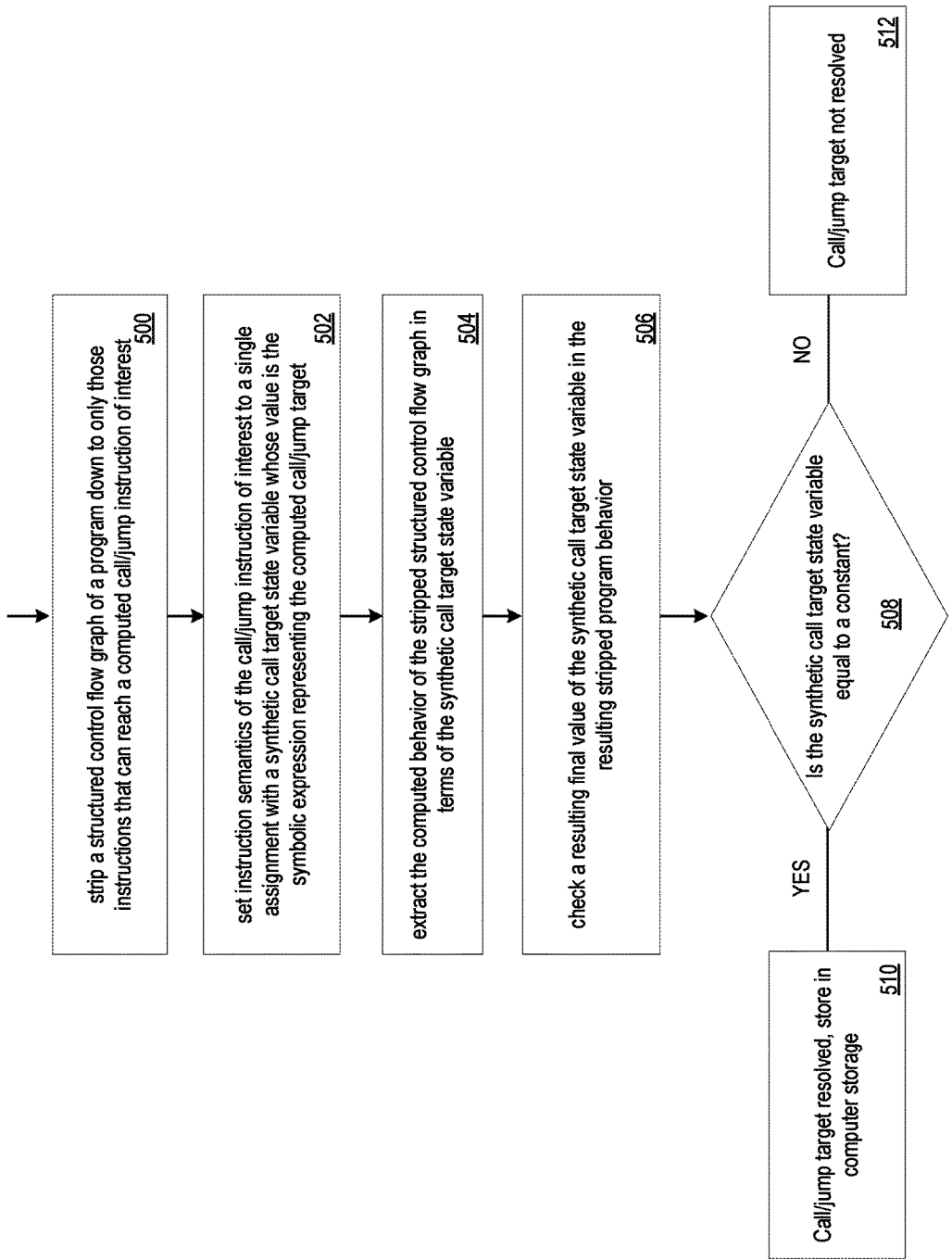
FIG. 5 is a flowchart illustrating an example of call/jump target resolution via computed behavior in accordance with the present disclosure.
Figure 6:
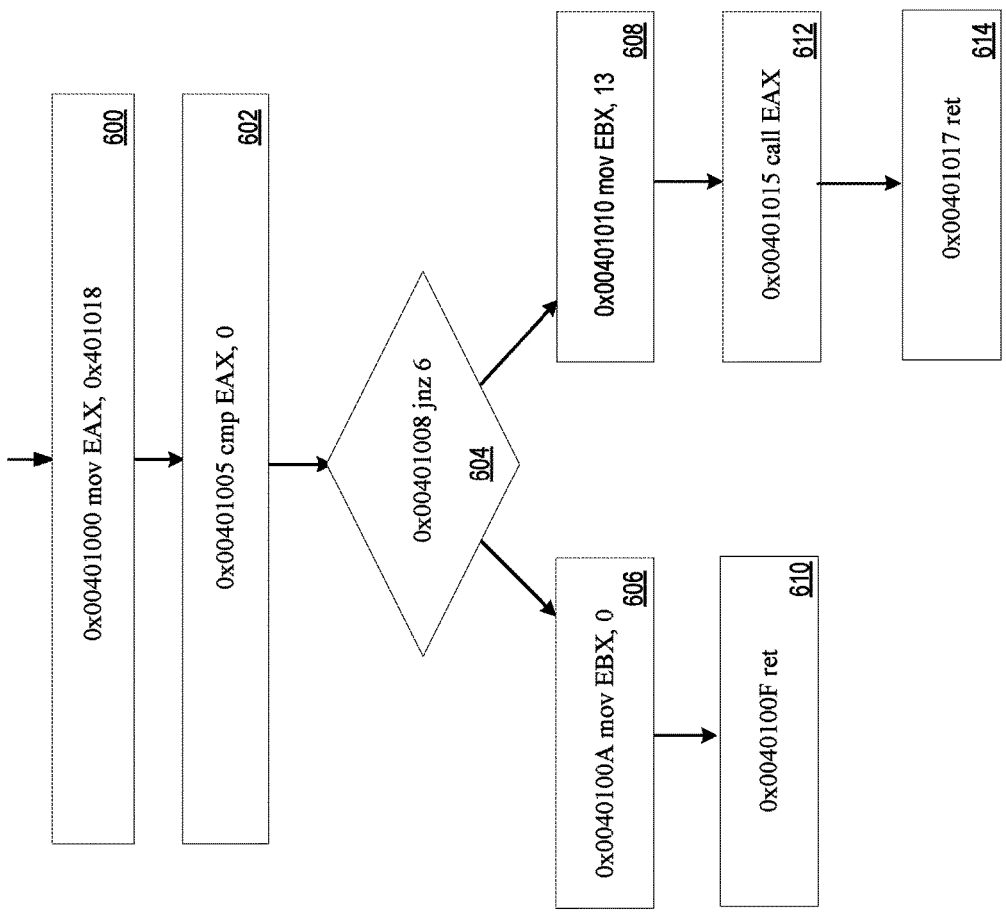
FIG. 6 is flowchart illustrating an example control flow graph in accordance with the present disclosure.

FIG. 5 is a flowchart illustrating an example of call/jump target resolution via behavior computation. In particular, a method is presented for use in conjunction with one or more functions and features described in conjunction with FIGS. 1-4, and also FIGS. 5-7.

Binary executable files typically contain call or jump instructions where the call/jump target is computed at run time. When performing static analysis of these executable files, it is necessary to resolve computed call/jump targets to actual target addresses. Computed call/jump targets may be resolved by using behavior computation. To better understand resolving call/jump targets by using behavior computation, an example embodiment program is presented below (shown in FIGS. 6 and 7) in Intel X86 assembly language:

"START: mov EAX, LOC3
 cmp EAX, 0
 jnz LOC1
 mov EBX, 0
 ret
LOC1: mov EBX, 13
LOC2: call EAX
 ret
LOC3: mov ECX, 12
 ret"

For this example, consider the target of the call instruction at address LOC2. The target address of the call instruction is computed at program run time and is contained in register EAX. The main tools to write programs in x86 assembly are the processor registers. The registers are like variables built in the processor. Using registers instead of memory to store values makes the process faster and cleaner. A list of available registers on the 386 and higher processors (32 bit registers) include general registers EAX EBX ECX EDX.

The method begins at step 500 in FIG. 5, where a processing module strips a control flow graph (CFG) of a program down to only those instructions that can reach a computed call/jump instruction of interest. For the example program, the original program CFG is given in FIG. 6. A stripped example CFG is given in FIG. 7. Note that instructions '0x0040100A mov EBX, 0' (element 606) and '0x0040100F ret' (element 610) have been stripped from the CFG since they cannot reach '0x00401015 call EAX' (LOC2) (element 612), the call/jump instruction of interest. Also, in FIGS. 6 and 7, elements 602 and 604 are instructions that make a decision, based on a value of the EAX register (compare in 602), on whether to take the branch (shown in FIG. 6) to 606 or to 608. The instruction in element 608 sets a value of the EBX register without impacting the computed call target resolution. Element 614 is simply an instruction for returning from the current function. This also does not affect the computed call resolution.

The method continues at step 502, where a processing module sets instruction semantics of the call/jump instruction of interest to a single assignment with a synthetic call target state variable whose value is the symbolic expression representing the computed call/jump target. In more detail, every instruction in the program being analyzed has associated functional instruction semantics defining all possible effects of executing the instruction on the state space of the chip executing the instruction. The state space of the chip typically consists of symbolic variables representing the state of the physical components of the chip, such as registers, flags, and memory. Step 502 extends the chip state space with one additional synthetic state variable, where synthetic means that the variable does not describe state information of the actual underlying physical chip. Using the state space augmented with the synthetic call target variable, the existing semantics of the call/jump instruction of interest are extended to state that the synthetic call target variable is assigned the value of the register or memory location containing the call target value used by the call/jump instruction. For the example program, the instruction semantics of '0x00401015 call EAX' (LOC2) (element 612) are extended with the synthetic variable assignment 'DYN_CALL_ADDR:=EAX'.

Figure 7:
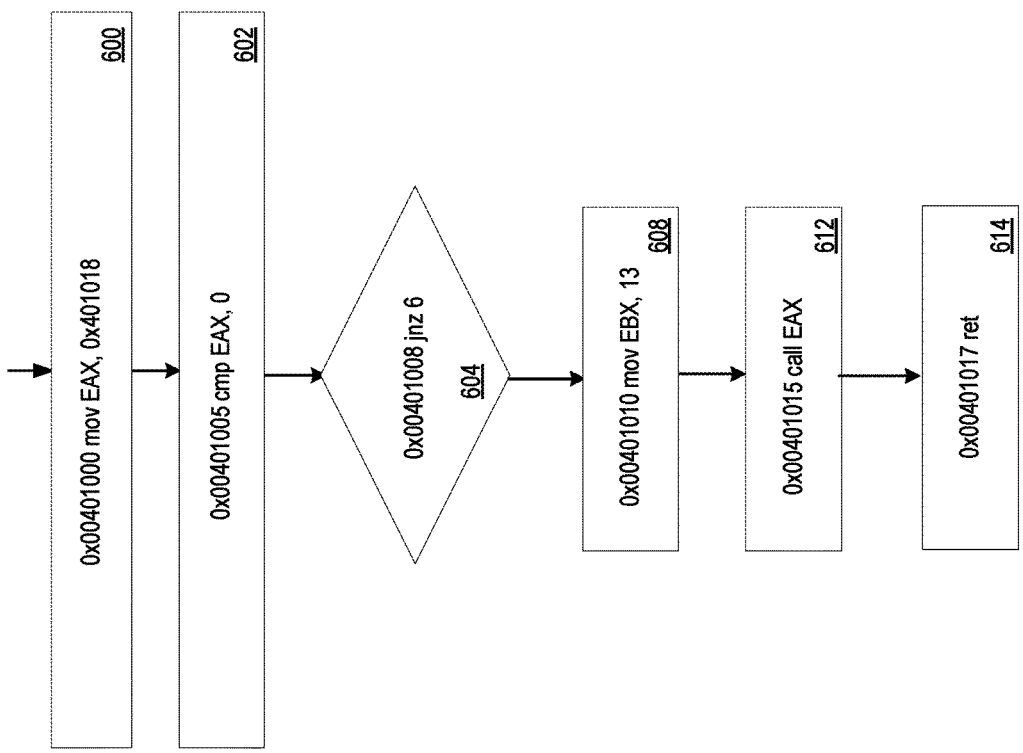
FIG. 7 is flowchart illustrating another example control flow graph in accordance with the present disclosure.

The method continues at step 504, where a processing module extracts the computed behavior of the stripped structured control flow graph in terms of the synthetic call target state variable. In more detail, the behavior computation algorithm described in referenced document article: "Function Extraction Technology: Computing the Behavior of Malware" is used to compute the possible value(s) of the synthetic call target variable given the stripped CFG as input. For the example program, the behavior of the stripped program shown in FIG. 7 is computed to find the value(s) of the synthetic variable DYN_CALL_ADDR.

The method continues at step 506 in FIG. 5, where a processing module checks the resulting final value(s) of the synthetic call target state variable in the resulting stripped program behavior. Following the example, synthetic call target variable DYN_CALL_ADDR is assigned 0x00401018 (LOC3) under all possible program execution paths due to the assignment to EAX performed at 0x00401000 (START) by instruction 'mov EAX, 0x00401018' (element 600 of FIGS. 6 and 7).

The method continues at step 508, where a processing module determines whether the final state of the synthetic call target state variable is equal to a constant, in which case the call/jump target has been resolved (step 510). The call/jump target is unresolved if the synthetic call target state variable is not resolved to a constant (step 512).

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, processing times, and/or accuracy. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module). As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items provides a desired relationship. For example, when the desired relationship is that a measurement metric 1 has a greater magnitude than measurement metric 2, a favorable comparison may be achieved when the magnitude of a measurement metric value 1 is greater than that of signal 2 or when the magnitude of a measurement metric value 2 is less than that of signal 1. Also, as may be used herein, the term "compares unfavorably".

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method of resolving a computed call/jump target instruction via behavior computation, the method comprises:
    stripping, by one or more computing devices, a structured control flow graph of a computer program down to only instructions that can reach a computed call/jump target instruction;
    setting, by the one or more computing devices, instruction semantics of the computed call/jump target instruction to a single assignment with a synthetic call target state variable whose value is a symbolic expression representing the computed call/jump target instruction;
    extracting, by the one or more computing devices, a computed behavior of the stripped structured control flow graph in terms of the synthetic call target state variable;
    checking, by the one or more computing devices, a resulting final value of the synthetic call target state variable in a resulting stripped computer program computed behavior;
    when the resulting final value of the synthetic call target state variable is equal to a constant value, resolving, by the one or more computing devices, the computed call/jump target instruction to the constant value; and
    storing, by the one or more computing devices, the constant value in a computer storage.

2. The method of claim 1, wherein the computer program includes any of:
    malware coded in an assembly language; or
    malware compiled into an assembly language.

3. The method of claim 1, wherein the extracting the computed behavior of the stripped structured control flow graph includes replacing specifics of procedural implementations with net behavior representing one or more algorithmic strategies for detecting malware.

4. The method of claim 1, wherein the stripping the structured control flow graph of the computer program down to only the instructions that can reach the computed call/jump target instruction includes analyzing each instruction in the computer program for associated functional instruction semantics defining possible effects of executing the instruction on a state space of a chip executing the instruction.

5. The method of claim 4, wherein the state space of the chip includes symbolic variables represent a state of physical components of the chip.

6. The method of claim 5, wherein the setting instruction semantics of the computed call/jump target instruction to the single assignment with the synthetic call target state variable extends the state space of the chip with one additional synthetic call target state variable, where the synthetic call target state variable does not describe state information of the chip.

7. The method of claim 6, wherein, when including the state space of the chip augmented with the synthetic call target state variable, existing instruction semantics of the computed call/jump target instruction are extended to a state that the synthetic call target state variable is assigned a value of a register or a memory location containing a call target value used by the computed call/jump target instruction.

8. The method of claim 5, wherein the physical components of the chip include any of: registers, flags, or memory.

9. The method of claim 1, wherein the computer program includes binary executable files with the computed call/jump target instruction and the computed call/jump target instruction reflecting actual target addresses.

10. The method of claim 9, wherein the actual target addresses are retained in a processor register.

11. A non-transitory computer readable storage medium comprises resolution of computed call/jump target instructions via behavior computation, the non-transitory computer readable storage medium comprises:
at least one memory section that stores operational instructions that, when executed by one or more processing modules of one or more computing devices, causes the one or more computing devices to:
strip a structured control flow graph of a computer program down to only instructions that can reach a computed call/jump target instruction;
set instruction semantics of the computed call/jump target instruction to a single assignment with a synthetic call target state variable whose value is a symbolic expression representing the computed call/jump target instruction;
extract a computed behavior of the stripped structured control flow graph in terms of the synthetic call target state variable;
check a resulting final value of the synthetic call target state variable in a resulting stripped computer program computed behavior;
when the resulting final value of the synthetic call target state variable is equal to a constant value, resolve the computed call/jump target instruction to the constant value; and
store the constant value in a computer storage.

12. The non-transitory computer readable storage medium of claim 11, wherein the computer program includes any of:
malware coded in an assembly language; or
malware compiled into an assembly language.

13. The non-transitory computer readable storage medium of claim 11, wherein the extract the computed behavior of the stripped structured control flow graph includes replacing specifics of procedural implementations with net behavior representing one or more algorithmic strategies for detecting malware.

14. The non-transitory computer readable storage medium of claim 11, wherein the strip the structured control flow graph of the computer program down to only the instructions that can reach the computed call/jump target instruction includes analyzing each instruction in the computer program for associated functional instruction semantics defining possible effects of executing the instruction on a state space of a chip executing the instruction.

15. The non-transitory computer readable storage medium of claim 14, wherein the state space of the chip includes symbolic variables represent a state of physical components of the chip.

16. The non-transitory computer readable storage medium of claim 15, wherein the set instruction semantics of the computed call/jump target instruction to the single assignment with the synthetic call target state variable extends the state space of the chip with one additional synthetic call target state variable, where the synthetic call target state variable does not describe state information of the chip.

17. The non-transitory computer readable storage medium of claim 16, wherein, when including the state space of the chip augmented with the synthetic call target state variable, existing instruction semantics of the computed call/jump target instruction are extended to a state that the synthetic call target state variable is assigned a value of a register or a memory location containing a call target value used by the computed call/jump target instruction.

18. A computing device of a group of computing devices, the computing device comprises:
an interface;
a local memory; and
a processing module operably coupled to the interface and the local memory, wherein the processing module functions to:
strip a structured control flow graph of a computer program down to only instructions that can reach a computed call/jump target instruction;
set instruction semantics of the computed call/jump target instruction to a single assignment with a synthetic call target state variable whose value is a symbolic expression representing the computed call/jump target instruction;
extract a computed behavior of the stripped structured control flow graph in terms of the synthetic call target state variable;
check a resulting final value of the synthetic call target state variable in a resulting stripped computer program computed behavior;
when the resulting final value of the synthetic call target state variable is equal to a constant value, resolve the computed call/jump target instruction to the constant value; and
store the constant value in a computer storage.

19. The computing device of claim 18, wherein the extract the computed behavior of the stripped structured control flow graph includes replacing specifics of procedural implementations with net behavior representing one or more algorithmic strategies for detecting malware.

20. The computing device of claim 18, wherein the strip the structured control flow graph of the computer program down to only the instructions that can reach the computed call/jump target instruction includes analyzing each instruction in the computer program for associated functional instruction semantics defining possible effects of executing the instruction on a state space of a chip executing the instruction.

* * * * *